(12) United States Patent  
Hulick, Jr. et al.

(10) Patent No.: US 11,973,843 B2  
(45) Date of Patent: Apr. 30, 2024

(54) ON DEMAND END USER MONITORING FOR AUTOMATED HELP DESK SUPPORT

(71) Applicant: Cisco Technology, Inc., San Jose, CA (US)

(72) Inventors: Walter T. Hulick, Jr., Pearland, TX (US); Carlos M. Pignataro, Cary, NC (US); David John Zacks, Vancouver (CA); Thomas Szigeti, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/846,146

(22) Filed: Jun. 22, 2022

(65) Prior Publication Data

US 2023/0421651 A1    Dec. 28, 2023

(51) Int. Cl.
  *H04L 67/50*     (2022.01)
  *G06Q 10/10*     (2023.01)
  *H04L 67/10*     (2022.01)
  *H04L 67/1396*   (2022.01)

(52) U.S. Cl.
  CPC .......... *H04L 67/535* (2022.05); *G06Q 10/10* (2013.01); *H04L 67/10* (2013.01); *H04L 67/1396* (2022.05)

(58) Field of Classification Search
  CPC ... H04L 67/535; H04L 67/10; H04L 67/1396; G06Q 10/10
  See application file for complete search history.

(56) References Cited

U.S. PATENT DOCUMENTS

| | | | |
|---|---|---|---|
| 11,537,627 B1* | 12/2022 | Baskaran | G06F 16/951 |
| 2010/0088404 A1* | 4/2010 | Mani | H04L 67/125 |
| | | | 709/224 |
| 2014/0258513 A1 | 9/2014 | Letca et al. | |
| 2015/0288584 A1* | 10/2015 | Acharya | H04L 43/04 |
| | | | 709/224 |
| 2016/0119202 A1 | 4/2016 | Iyer et al. | |
| 2017/0034030 A1* | 2/2017 | Feng | H04L 67/02 |
| 2017/0034282 A1* | 2/2017 | Anand | H04L 43/06 |
| 2017/0250887 A1 | 8/2017 | Sadana et al. | |
| 2017/0366421 A1* | 12/2017 | Dam | H04L 43/045 |
| 2018/0253373 A1* | 9/2018 | Mathur | G06F 11/3692 |
| 2020/0274784 A1* | 8/2020 | Sharma | H04L 43/0805 |
| 2021/0126843 A1 | 4/2021 | Dam et al. | |
| 2022/0027431 A1 | 1/2022 | Zheng et al. | |

FOREIGN PATENT DOCUMENTS

| | | | | |
|---|---|---|---|---|
| WO | WO-2012162419 A2 * | 11/2012 | ............. | H04L 41/14 |
| WO | WO-2019088885 A1 * | 5/2019 | ......... | G06F 11/3006 |

* cited by examiner

*Primary Examiner* — Cheikh T Ndiaye  
(74) *Attorney, Agent, or Firm* — Edell, Shapiro & Finnan, LLC

(57) ABSTRACT

Techniques are provided for an "on demand" or event-triggered end user monitoring/remote user monitoring (EUM/RUM) solution that is activated when the user has requested it, or an event (conditions of which are set by a user) occurs that triggers activation of the EUM/RUM solution. This EUM/RUM may be completely integrated into an enterprise IT Help Desk system, whereby support "tickets" are automatically generated when the monitoring solution is instantiated.

21 Claims, 6 Drawing Sheets

ON DEMAND END USER MONITORING FOR AUTOMATED HELP DESK SUPPORT

TECHNICAL FIELD

The present disclosure relates to networking and more particularly to troubleshooting networking issues associated with cloud application services.

BACKGROUND

Most end user monitoring/remote user monitoring (EUM/RUM) solutions are automatically activated for users and are collecting RUM events regardless of whether performance issues exist or not. In many cases, these monitoring solutions collect unnecessary data which incurs additional bandwidth. These solutions operate on an "all or nothing" basis or they are too granular because is they are controlled by the backend application.

Moreover, these monitoring solutions are mainly tied to a hosted application by a vendor paying for the solution backend. As a result, there is little visibility into the performance of other applications in the cloud and even if there is, that data would not be shared with the user or the user's corporate Help Desk.

Due to privacy issues today, most users do not want monitoring in their local running software (e.g., a browser) from outside companies due to the invasive nature of it.

DESCRIPTION OF EXAMPLE EMBODIMENTS

Overview

In one embodiment, techniques are provided for an "on demand" or event-triggered EUM/RUM solution that is activated when the user has requested it, or an event (conditions of which are set by a user) occurs that triggers activation of the EUM/RUM solution. This EUM/RUM may be completely integrated into an enterprise IT Help Desk system, whereby support "tickets" are automatically generated when the monitoring solution is instantiated.

In one form, a computer-implemented method is provided that is performed by a client that is accessing one or more services from a cloud-based application. The method includes, responsive to a user command from a user at the client or a particular event associated with one or more services provided by the cloud-based application to the client, generating a monitoring initiation command to initiate a monitoring session for network communications between the client and the cloud-based application. The method further includes providing the monitoring initiation command into a network, the monitoring initiation command causing at least one networking device in the network to gather performance metrics for the network communications associated with the one or more services provided by the cloud-based application for the client.

Example Embodiments

Existing application monitoring solutions are focused on the cloud-based application, and to this end are located on the backend wherever that application is hosted. That is, the monitoring solution (cloud, etc.) runs and is controlled where cloud-application runs. These are typically cumbersome solutions that are controlled by whoever owns the cloud-based application.

Presented herein is an end user monitoring solution that is more focused on the client side or end user side, as opposed to the backend cloud-based application. For example, the end user is an enterprise user of an application hosted by a third party, and there is a desire to enable that enterprise user to do monitoring from the perspective of the user, such as a client side function running on an end user device.

Figure 1:
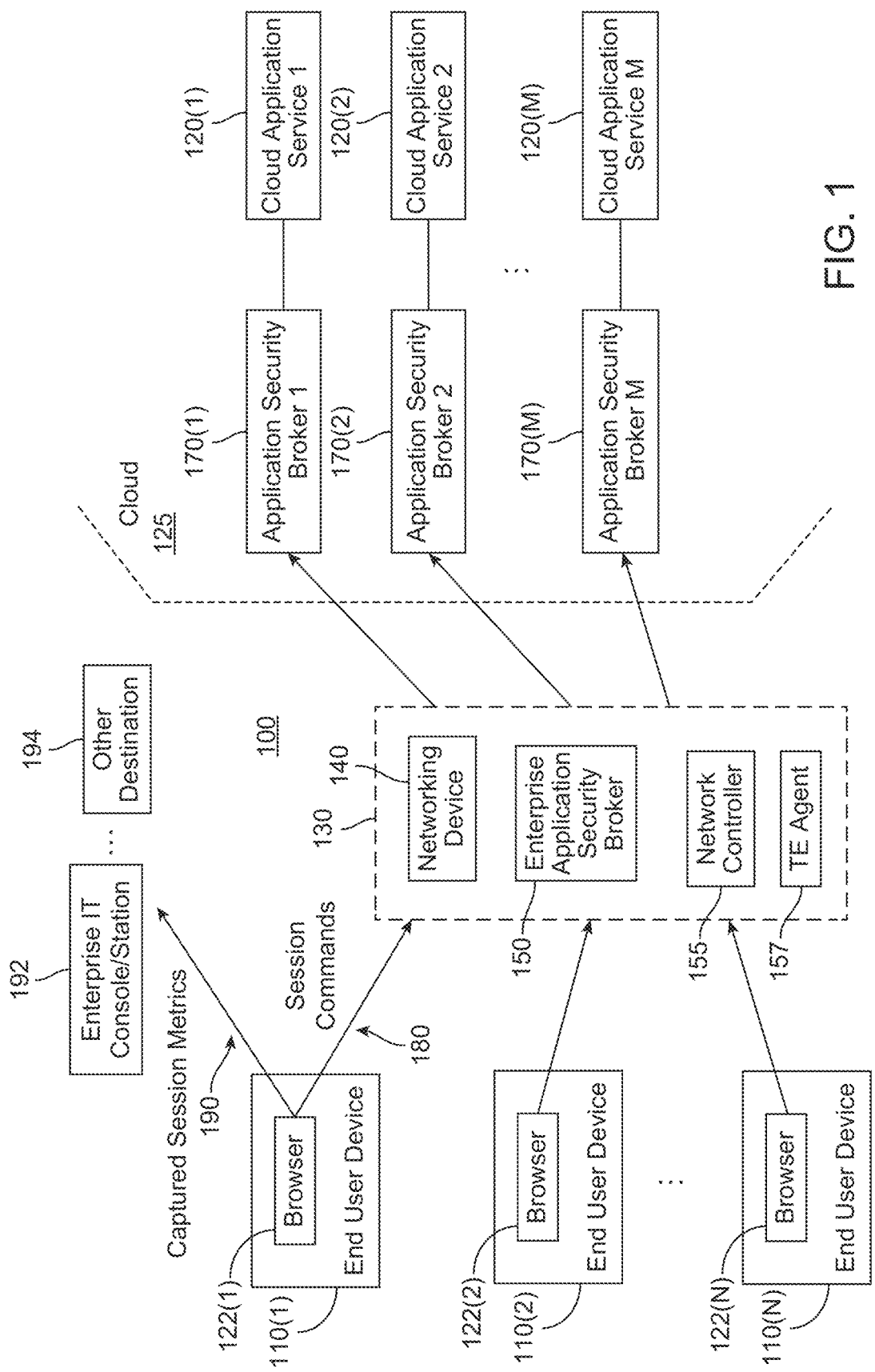
FIG. 1 is a block diagram of a networking environment in which a client is configured to initiate an end user monitoring session, according to an example embodiment.

Reference is now made to FIG. 1, which shows a system environment 100 in which the end user monitoring solution techniques may be deployed, according to an example embodiment. There is a plurality of end user devices 110 (1)-110(N), each of which includes a software function that accesses services of one or more of a plurality of cloud-based applications 120(1)-120(M) in the cloud 125. In one example, the software function running on an end user device is a web browser, but this is not meant to be limiting. Thus, each end user device 110(1)-110(N) includes a browser 122(1)-122(N), respectively. The instance of a browser connecting to one of the cloud-based applications 120(1)-120(M) may be viewed as a client functionality with respect to one or more services provided by the cloud-based application with which the browser has an ongoing session.

The end user devices 110(1)-110(N) may be a laptop computer, desktop computer, tablet, Smartphone, or a virtual device, such as virtual desktop or virtual PC instance associated with a particular end user. The users of the end user devices 110(1)-110(N) may be, for example, employees of a given enterprise and the end user devices are connected to an enterprise network 130 that includes, among other elements, a networking device 140 and an enterprise application security broker 150, for example. The networking device 140 and enterprise application security broker 150 are used to manage network communications exchanged between the end user devices 110(1)-110(N). The networking device 140 may be a router, a load balancer, a proxy, a firewall, etc. In one example, the networking device 140 is a router that is closest to the end user device that initiates a monitoring session. The enterprise network 130 may also include a network controller 155 that performs various network management and control functions for the enterprise network 130. The network controller 155 need not be physically resident with the enterprise facility as it may be located remotely in the cloud. In addition, the enterprise network 130 may include a Traffic Engineering (TE) agent 157

(running on a given networking device) that can serve as a probe source, and may be used in connection with techniques described below.

The cloud application services 120(1)-120(M) reside in the cloud 125. Each cloud application service 120(1)-120(M) may have an associated cloud-based application security broker 170(1)-170(M), as shown in FIG. 1. The cloud-based application security brokers 170(1)-170(M) perform network security controls for the respective cloud applications 120(1)-120(M). Said another way, the enterprise application security broker 150 and the cloud-based application security brokers 170(1)-170(M) as an intermediary between cloud application services 120(1)-120(M) and cloud consumers (e.g., browsers of end user devices 110(1)-110(N) to enforce an organization's security policies for cloud application access and usage. However, normally the cloud-based application security brokers 170(1)-170(M) protect the cloud application service providers of the cloud application services 120(1)-120(M). As described further below, the cloud-based application security brokers 170(1)-170(M) may be configured to inject client-side monitoring session instrumentation.

According to the techniques presented herein, the end user devices 110(1)-110(N) are configured to enable an end user to instantiate a monitoring session with respect to network communications between a respective end user device (e.g., a browser on that respective end user device) and a respective cloud application service. The monitoring session is instantiated, configured and terminated by way of session commands 180 that may be injected in any of several locations: networking device 140 in the enterprise network 130, enterprise application security broker 150, cloud-based application security brokers 170(1)-170(M) and the cloud applications 120(1)-120(M). The captured session metrics 190 that are produced as a result of the monitoring session may be delivered to any of a variety of specified destinations, including the end user device that initiated the monitoring session, an enterprise IT console/station 192 (email address for an enterprise IT Help Desk), or any other destination 194 that may be specified by an email address, text message, Uniform Resource Location (URL), etc.

The monitoring session may consist of a series of EUM timing measurements that are associated with a support ticket identifier (ID). The end user may terminate the monitoring session that whenever they want, and have the ticket ID and captured session metrics 190 automatically dispatched to IT personnel on the client side, e.g., the enterprise IT console/station 192. Before the client traffic goes out to the cloud from the browser running on the end user device, "instrumentation" is injected into the page requests to the cloud application service to allow the client side to capture session metrics that can be directed anywhere specified by the end user.

The "instrumentation" is a set of commands that are appended "inline" to page requests so as to trigger the capturing of metrics associated with the performance of a session between and end user device and a cloud application service. In one example, the invocation of monitoring session involves inserting JavaScript commands inline that look at a URL in a page request sent from a browser on an end user device for traffic (network communications) that leaves the enterprise network 130 destined for a cloud application provider associated with one of the cloud application services 120(1)-120(M). In so doing, metrics are captured for the traffic flow and these metrics reveal how the cloud application service is operating. This solution enables an end user to have visibility and control over what is to be monitored. In one example, the metrics are obtained from the inline networking device 140 (usually owned/controlled by the enterprise), that is closest to the client (end user device) that invoked the monitoring session.

Again, the end user or the occurrence of a particular event or episode triggers when to do a monitoring session (including a ticket or other identifier) that may be used to tag metrics that are sent to an IT Help Desk. The amount of data that is captured/recorded is much smaller than a cloud application side monitoring solution. Thus, in contrast to existing cloud-based application side monitoring solutions, the end user monitoring solution presented herein is used for a more focused (and client-side) troubleshooting/triage situation.

In the end user monitoring solution techniques, the user modifies the Uniform Resource Locator (URL) for a page request, or the user clicks a user interface element that automatically modifies the URL of a page request, and based on that, that triggers the performance metrics to be captured.

There is a messaging system around the URL page request format, and this is leveraged to trigger the performance metrics. The commands of the messages are seen by the networking equipment (proxy, router, load balancer, security broker, or even the cloud-based application itself, etc.). Those entities understand the messages (and the protocol over which they are carried): start session, end session, session ID, a user-specified endpoint reporting destination to which the performance results are delivered.

The monitoring session could be instantiated in several ways: user types (or button creates) the URLs, or the user may select it from somewhere, or could set up a 1000 eyes test to execute all the same commands (programmatically generated) (such in response to a test result that can back badly, time of day, etc.)—episode (in response to some event/episode) and there is a user on the endpoint.

Figure 2:
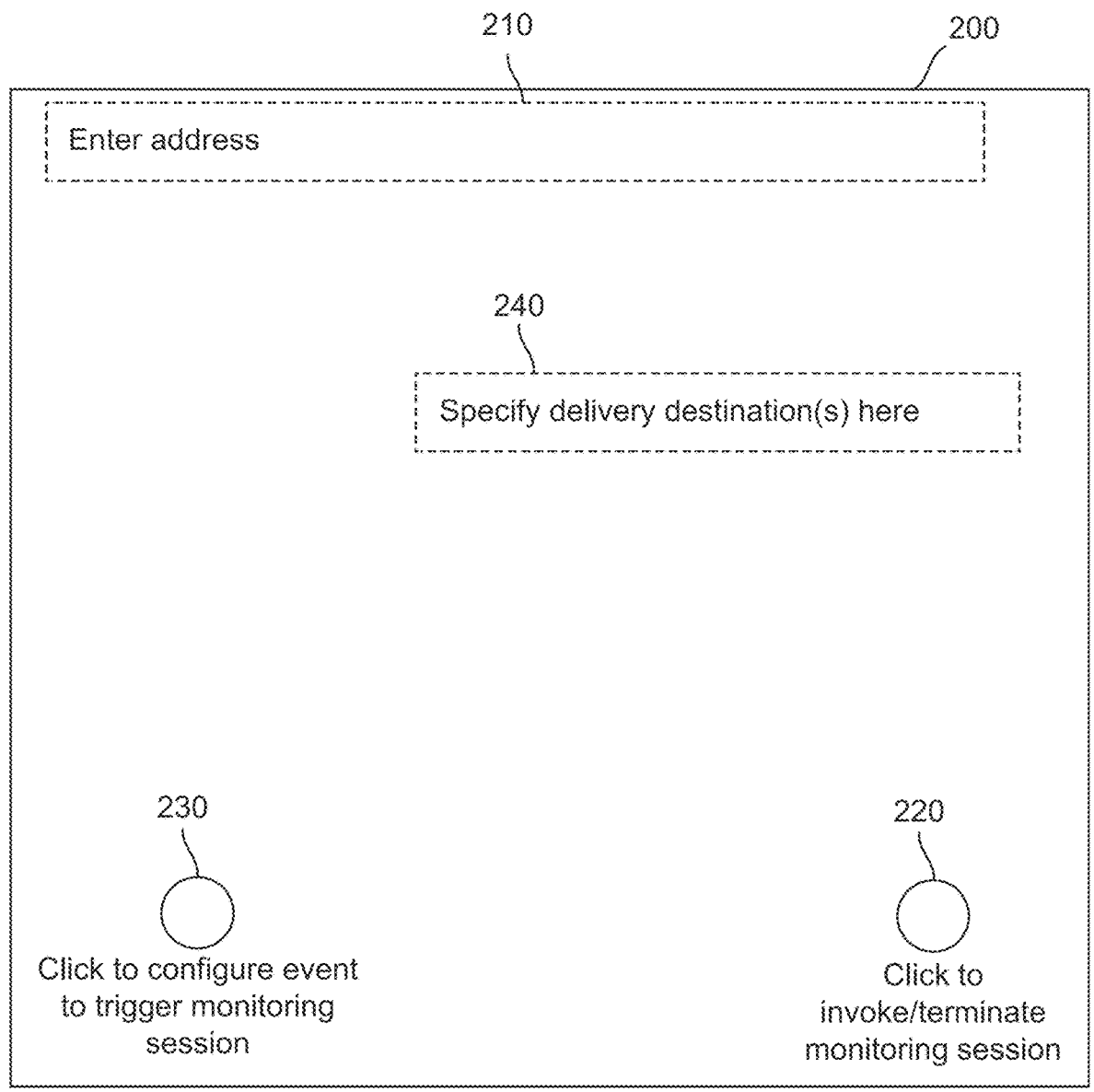
FIG. 2 is a diagram of a web page and illustrating how a monitoring session may be invoked by an end user, according to an example embodiment.

Reference is now made to FIG. 2, with continued reference to FIG. 1. FIG. 2 shows a page 200 of a web browser running on one of the end user devices shown in FIG. 1. The page includes a search bar or field 210 in which a user may enter the URL for a given destination. The techniques presented herein provide for an automated way that a user could "request" an EUM troubleshooting instance for a cloud application by specifying either query parameters or headers on outbound requests to the cloud application.

An example of a command that is appended to a URL to start a monitoring session instrumentation cycle is "EUM_ENABLE=session". A monitoring session identifier (e.g., EUM_ID header) would automatically be inserted into each request. An example of a command that is appended to a URL to stop a monitoring session instrumentation cycle is "EUM_DISABLE=session".

For example, an original request to a cloud application service may be:

https://www.cloudapplicationservice1.com/index. html#servicename1

In one form, an example of a monitoring session initiation command for this example cloud application service is:

https://www.cloudapplicationservice1.com/index.html? EUM_ENABLE=session1&extension=xxx]#service- name1

This will either load monitoring session instrumentation into the browser or download/install a browser extension set to instrument this page on the next page request and continue for every page request afterwards. The captured metrics would be added to a session recording of the session performance metrics.

The metrics will continue to be captured until the user enters a command to terminate the monitoring session, after which no further instrumentation would be applied. An example of a monitoring session termination command may be:

https://www.cloudapplicationservice1.com/index.html?EUM_DISABLE=session1&extension=xxx]#service-name1

The monitoring session is tracked by the session identifier value (EUM_ID) in the EUM_ENABLE command. All pages loaded from this point forward are tracked. Every page will automatically have a EUM_ID inserted to track each page load instance.

FIG. 2 also shows other options for controlling a monitoring session instead of a user entering the appropriate text in the search bar 210 of page 200. Specifically, there may be a graphical user interface element (e.g., a button) 220 that, when selected while a user is connected to a cloud application service, will automatically insert into the next page request that is sent, the appropriate text to enable (or disable) a monitoring session with respect to that cloud application service session. The insertion of the enable and disable commands into the URL string may occur without being visible to the user.

In still another form, a graphical user interface element 230 may be provided to set conditions associated with occurrence of a particular event or episode that will automatically trigger invocation of a monitoring session for as long as that event is occurring, for some specified period of time after the event is initially detected, or for a duration based on other conditions or parameters. Examples of a particular event or episode include a website not being reachable, delay thresholds associated with interactions with a website, choppy or poor audio quality if the sessions involves voice audio.

Regardless of which of the various schemes that the URL request gets created as described above, it is intercepted and evaluated at one of the following locations: at an outbound router or proxy (e.g., networking device 140) or enterprise application security broker in the enterprise network 130, in the cloud 125, such as at one of the application security brokers 170(1)-170(M) or at one of the cloud application services 120(1)-120(M). When the injection of the monitoring session instrumentation occurs in the enterprise network, this allows for flexibility to inject a monitoring session for any cloud application service. By contrast, when the injection of the monitoring session instrumentation occurs in the cloud or at the cloud application service, then the end user has less control over it.

After the user has initiated the monitoring session, a prompt 240 may be displayed in the current web page, in another web page, or in some other window. This prompt 240 is provided to enter information specify one or more metrics delivery destination (as e.g., an email address, a URL, a cloud storage service like DropBox™, a screen on the end user's device, download to browser, etc.) As a default, the metrics may be delivered to the same place (a browser) with which the user is interacting. As a further variation, the metrics may, as a default, be sent the initiator and/or an IT pre-configured destination (e.g., IT Help Desk).

Figure 3:
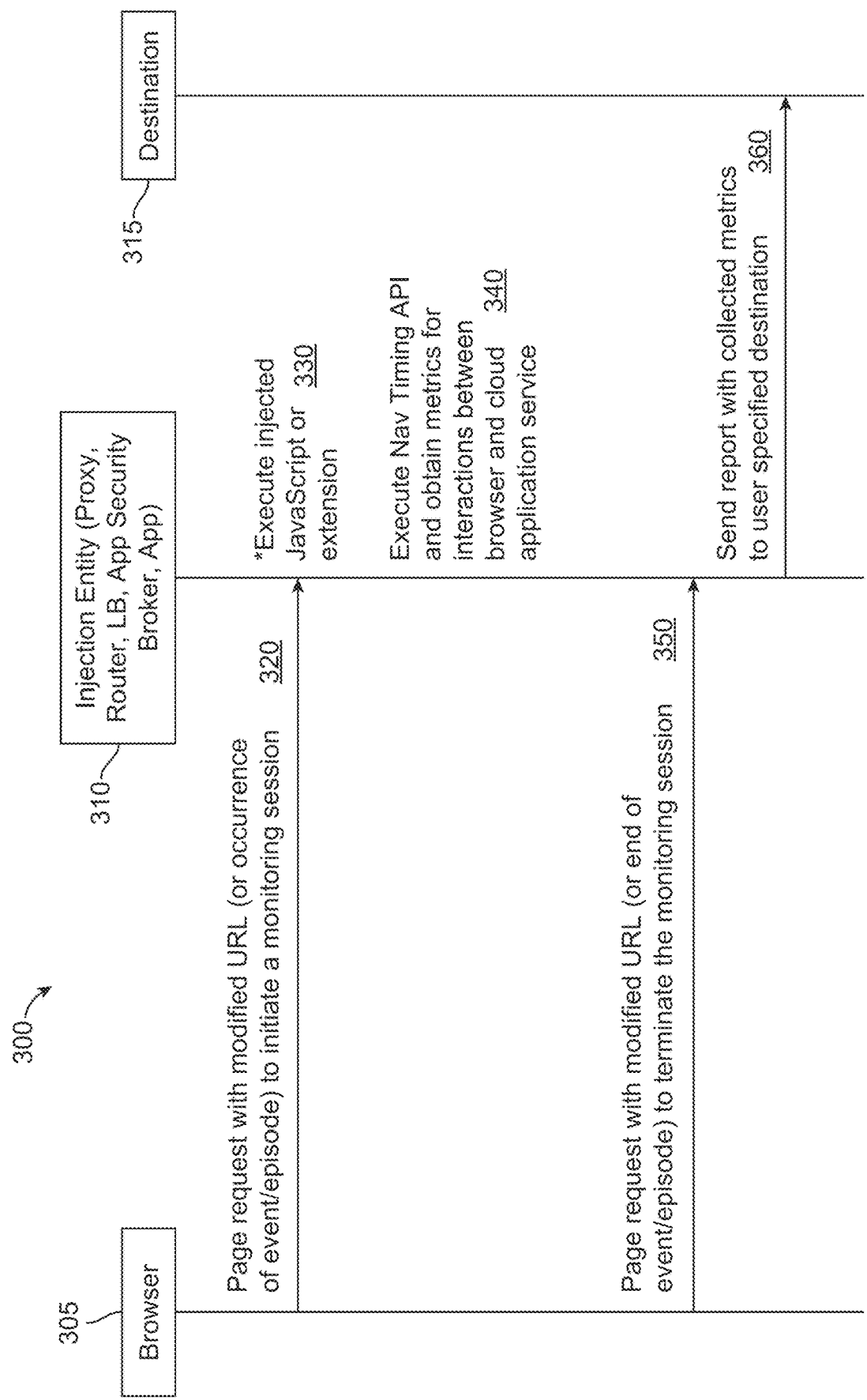
FIG. 3 is a sequence diagram depicting an operational workflow involving a browser of a client, an injection entity that captures the performance metrics and a destination to which the performance metrics may be delivered, according to an example embodiment.

Reference is now made to FIG. 3. FIG. 3 illustrates a sequence diagram for an operational workflow 300 according to an example embodiment. In one example, an end user is experiencing a technical or performance issue with a cloud application service and engages an IT help desk for the enterprise or the end user goes to a troubleshooting page in the enterprise. The IT help desk may tell the end user what to do in order to initiate a monitoring session and have the results sent to the IT help desk, or the troubleshooting page may enable an automated action to initiate the monitoring session by presenting one or both of the graphical user interface elements 220 and 230 shown in FIG. 2. The IT help desk could send a report of the monitoring session results to the cloud application service, if desired.

The operational workflow 300 involves interactions among a browser 305 of an end user device, an injection entity 310 (e.g., proxy, router, load balancer, sidecar, enterprise application security broker, cloud application security broker, synthetic test points, or the cloud application service) and a destination 315 of the monitoring session results.

The injection entity 310 is any networking device or process that is inline to the network communications between the browser 305 of the end user device and the cloud application service. The injection entity 310 also has the ability to seethe URL string, even if is encrypted for Transport Layer Security (TLS) or other network security mechanisms and has access to public key or other certification infrastructure. Thus, the injection entity 310 serves as a network instrumentation point that does monitoring instance correlation with an identifier (e.g., EUM_ID)

At 320, the browser 305 running on an end user device makes a page request with a modified URL, or an event or episode occurs, to initiate a monitoring session. Several mechanisms are described above in connection with FIG. 2 by which the page request may be generated at operation 320.

Because the injection entity 310 is inline with the network communications between the browser 305 on the end user device and the cloud application service, the injection entity 310 receives the page request with the modified URL that indicates a monitoring session is to be initiated. At 330, the injection entity 310 executes injected JavaScript or a browser extension, and at 340, the injection entity 310 executes Navigation (Nav) timing API calls to obtain performance metrics for interactions between the browser 305 and the cloud application service. That is, once that injected JavaScript or extension is executed, the injection entity 310 will download what it needs to complete the instrumentation from the cloud and then executes the Nav Timing API calls to obtain the performance metrics.

The Nav Timing API may be used to track and improve website performance by accessing metrics (from JavaScript) to access metrics for how long it takes to load and render a web page. JavaScript provides an interface for a web application to expose timing-related information from browsers. This is achieved by breaking down the events that are to retrieve and display web pages in a browser, and providing timestamps for each and every event. The Nav API stores performance entries (metrics for pages and resources) in a performance entry buffer which is a list accessible by JavaScript. The functionality may exist in the window.performance namespace as:

```
//Get Navigation Timing entries:
performance.getEntriesByType ("navigation") ;
```

After gathering performance data on the client-side using this API, the data can be transmitted to a destination using an AJAX request. This helps to measure data such as the amount of time needed to unload a previous page, how long domain lookups take, the total time spent executing the window's load handler, etc.

The interfaces involved include a Performance interface and a PerformanceNavigationTiming interface. The Performance interface is used to gather performance information about a current document being loaded. The PerformanceNavigationTiming interface provides methods and properties to store and retrieve metrics regarding the browser's document navigation events. For example, this interface can be used to determine how much time it takes to load or unload a document.

The Navigation API tracks all the main events that occur during a typical page-load, allowing us to have a better understanding of the page life cycle. These events include: Navigation Start, Unload Events, Redirection, Domain Lookup, Connection Times, Request/Response Times, DOM Events, and Onload events.

Navigation Start: The attribute navigationStart marks the time when the previous document/page has terminated. If there is no previous document, this value will be equal to the value of performancetiming.fetchStart which is the time at which the browser is ready to fetch the requested document using an HTTP request.

Unload Events: An unload even occurs when the user navigates away from the page. A page reload will first create an unload event. The values of both the start and end of these events can be obtained from the attributes unloadEventStart and PerformanceTiming.unloadEventEnd.

Redirection: Any overhead that is added by HTTP redirects can be observed from the attributes redirectStart and PerformanceTiming.redirectEnd.

Domain Lookup: The time when domain lookup starts and ends is marked by the attributes domainLookupStart and PerformanceTiming.domainLookupEnd respectively.

Connection Times: The value for the time instant when the request was made to open a connection to the network is measured by the attribute connectStart and the time instant when the connection is opened is measured by PerformanceTiming.connectEnd. If there is an issue in the transport layer, the connection establishment is restarted again. For HTTPS connections, the attribute that measures the start of the secure handshake is PerformanceTiming.secureConnectionStart.

Request/Response Times: The time when the browser sent the request to obtain the document is stored in the attribute requestStart. The time when the browser received the first byte and the last byte of the response is in the attributes PerformanceTiming.responseStart and PerformanceTiming.responseEnd. The response to the requests can be from any source such as a server or cache and that is independent of the timings.

DOM Events: There are various events that occur before a page has fully loaded and some critical components of the same process can be separated by the various DOM events and Onload events. HTML DOM events allow JavaScript to register different event handlers on elements in an HTML document. Events are used in combination with functions, and the function is not executed before the event occurs (such as when a user clicks a button).

The start time of the entire process can be retrieved from the attribute domLoading.

domInteractive marks the time at which browser has completed parsing the entire HTML and constructed the DOM i.e., the DOM is now ready.

Once the CSS Object Model is ready and no style-sheets that are blocking/waiting for some JS execution are left, the browser can begin creating the render tree. The start and end time of this process is marked by the domContentLoadedEventStart and domContentLoadedEventEnd events. It allows us to track how long this execution took.

domComplete marks the time when all the processing on the page is completed and all the sub-resources are ready.

Onload events: As a last step in every page load, the browser will trigger an onload event which can initiate any additional functions or logic waiting for this event. The start time of this is marked by PerformanceTiming.loadEventStart and the time instant the load event is complete is marked by PerformanceTiming.loadEventEnd.

Referring back to FIG. 3, in one example, if the injection entity is a router, proxy or load balancer, then it may perform a reverse proxy with code injection. More specifically, in one example, a nginx reverse proxy function may be employed, as specified in https://blog.fhrnet.eu/2017/09/20/nginx-reverse-proxy-with-code-injection/. The nginx_http_sub_module nginx module enables modifying proxied data (page content) to insert an analytics script.

Example pseudo code for the nginx_http_sub_module nginx module may take the form of:

```
location / {
    proxy_set_header Accept-Encoding "";
    proxy_pass http://backend;
    proxy_set_header X-Real-IP $remote_addr;
    proxy_set_header X-Forwarded-For $remote_addr;
    proxy_set_header Host $host;
    proxy_set_header Connection "Keep-Alive";
    proxy_set_header Proxy-Connection "Keep-Alive";
    sub_filter '</head>' '<script src="https://example.com/injected.js"></script></head>';
    sub_filter_once on;
}
```

This location block accepts requests and pass them to an upstream called "backend". It will then search for string </head> in the responses and if it finds a match, it will replace it with the string <script src="https://example.com/injected.js"></script></head>. sub_filter_once means that if the filter finds multiple occurrences of </head> in a response, it will replace just the first one.

In another example, if the injection entity 310 is an agent on the cloud application, then it may inject a JavaScript agent function as specified in https://docs.appdynamics.com/21.3/en/end-user-monitoring/browser-monitoring/browser-real-user-monitoring/inject-the-javascript-agent.

At 350, the monitoring session is terminated when the browser 305 sends a page request with a modified URL indicating that the monitoring session is to be terminated, or the event or episode that triggered the monitoring session to be initiated, has ended.

After the monitoring session is terminated, at 360, the injection entity sends the performance metrics obtained at 340 to the destination 315 as specified by the user when the monitoring session was initiated.

Thus, the operational workflow involves adding query parameters and/or headers to a page request by which a user requests an end user monitoring session. When the session is completed, the results are automatically sent to a user specified destination where they can be analyzed for determining an appropriate remedy, e.g., an IT Help Desk, etc. When the monitoring session termination command is issued, then whatever networking device or service is inline with the traffic sees this disable command and closes the monitoring session. A monitoring session report is then created and sent to whatever destination the user configured to receive the report (the user, an IT Help Desk, etc.), as specified in an email address provided by the user, text message number, etc., along with some priority that may be assigned to raise the report to the appropriate level of attention of the recipient.

In one example, a monitoring session report may contain:
Username of the end user
Contact Information of the end user
Timestamp
URL
Navigation (Nav) Timing Application Programming Interface (API) metrics.

Examples of metrics include those described above. These metrics are JavaScript accessible and built into every browser to obtain these metrics for every page that is loaded.

Figure 4:
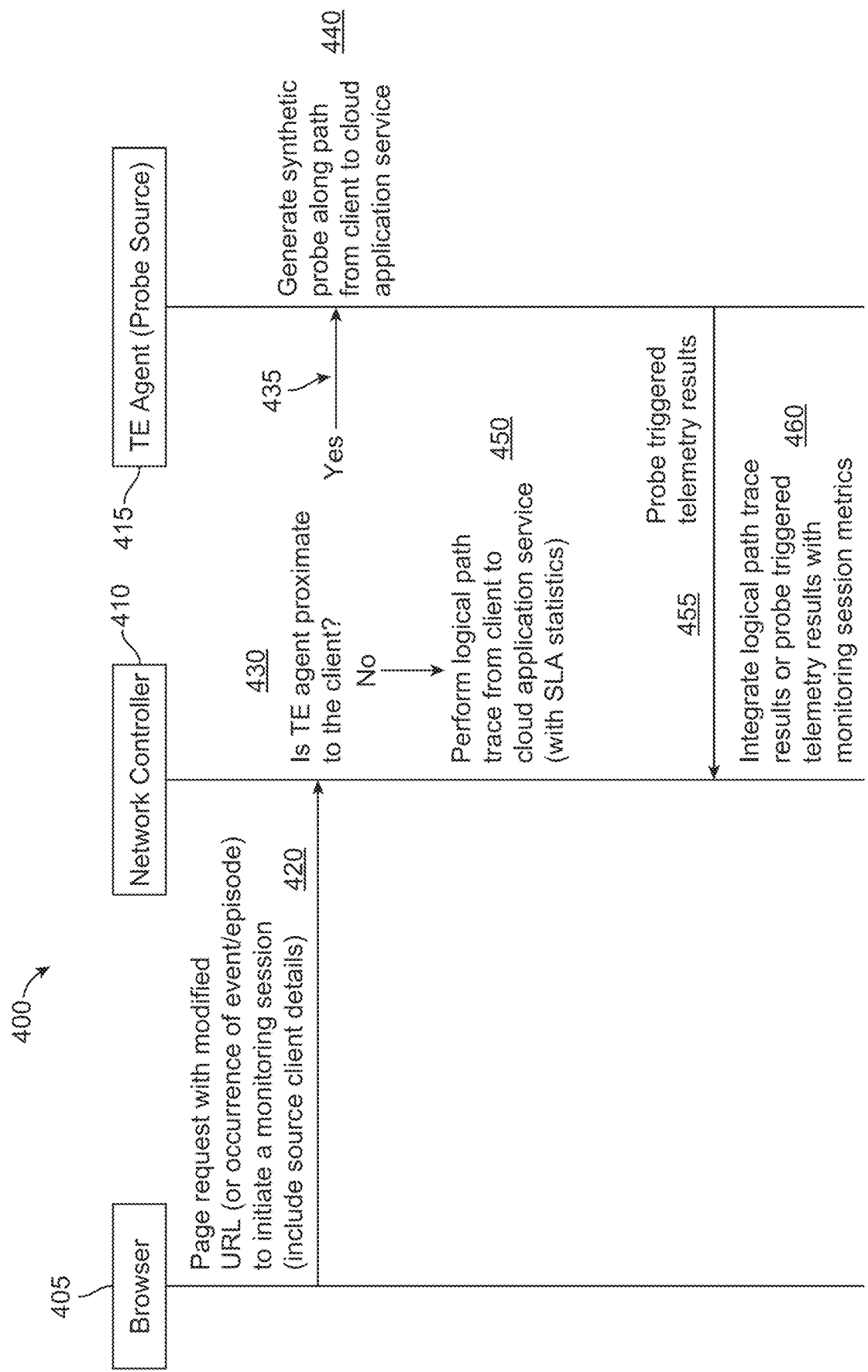
FIG. 4 is a sequence diagram for an operational workflow by which the end user monitoring techniques may integrate network telemetry functions, according to an example embodiment.

Reference is now made to FIG. 4. FIG. 4 shows an example operational workflow 400 by which the end user monitoring techniques may integrate network telemetry functions. The operational workflow 400 involves interactions among a browser 405 of an end user device, a network controller 410 for an enterprise network and a Traffic Engineering (TE) agent (probe source) 415. The operational workflow 400 begins at 420 by the browser 405 of an end user device making a page request with a modified URL (or occurrence of an event/episode) to initiating a monitoring session. The page request also includes source client details (source IP address and Transmission Control Protocol (TCP) port).

The network controller 410 receives the page request from the browser and determines the presence of the modified URL in the page request that signifies a monitoring session is to be initiated. Alternatively, the injection entity receives the page request (as shown in FIG. 3 and described above) and that injection entity sends a message to the network controller 410 to notify the network controller 410 that a monitoring session has been initiated. At 430, the network controller 410 determines whether there is a TE agent that is proximate to the client (the end user device where the browser 405 that initiated the monitoring session resides). If there is a TE agent proximate the client, then at 435, the network controller 410 commands the TE agent 415 to, at 440, generate a synthetic probe along a path from the client to the cloud application service with which the browser 405 has been communicating. This will cause network telemetry data to be gathered from networking devise along the path, and to provide such telemetry data back to the network controller 410. If, at 445, the network controller 410 determines that there is not a TE agent proximate to the client, at 450, the network controller 410 performs a logical path trace from the client to the cloud application service and obtains service level agreement (SLA) statistics. At 455, the TE agent 415 provides the probe triggered telemetry results to the network controller 410. At 460, the network controller 410 integrates the logical path trace results or the probe triggered telemetry results with the monitoring session metrics.

Figure 5:
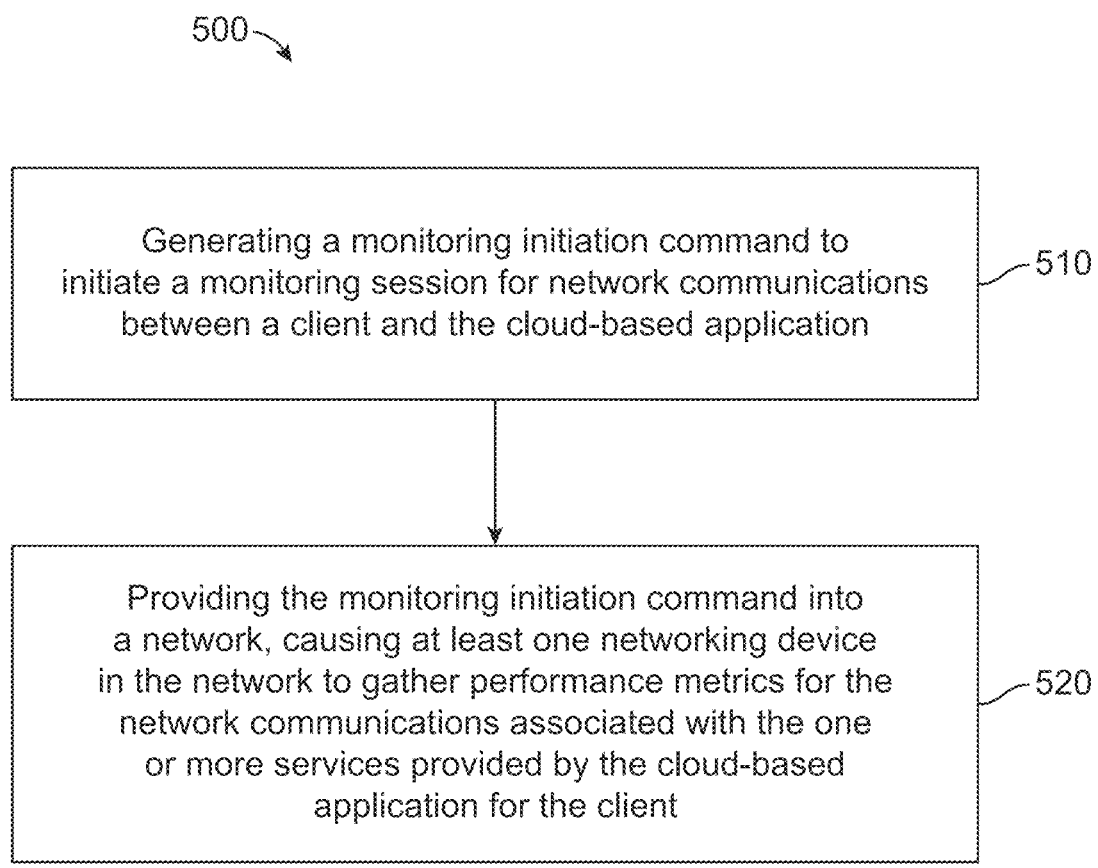
FIG. 5 is a high-level flow chart of the end user monitoring techniques, according to an example embodiment.

Turning now to FIG. 5, a high-level flow chart is shown for a method 500 according to an example embodiment. Method 500 is a computer-implemented method performed by a client that is accessing one or more services from a cloud-based application. At step 510, the method 500 includes generating a monitoring initiation command to initiate a monitoring session for network communications between a client and a cloud-based application. Step 510 may be responsive to a user command from a user at the client or a particular event associated with one or more services provided by the cloud-based application to the client. As explained above, the monitoring initiation command may be formatted according to a protocol that is understood by networking devices that carry the network communications between the client and the cloud-based application In one form, the monitoring initiation command may comprise a modified web page request derived from a page request that points a web browser to the cloud-based application, and wherein the modified page request is configured to be intercepted and evaluated at one of: a networking device or access security broker in an enterprise network of the client; an access security broker in the network that hosts the cloud-based application; or the cloud-based application itself.

Step 510 of generating the monitoring initiation command may further include generating an identifier that is associated with the performance metrics obtained during the monitoring session.

At step 520, the method 500 includes providing the monitoring initiation command into a network, the monitoring initiation command causing at least one networking device in the network to gather performance metrics for the network communications associated with the one or more services provided by the cloud-based application for the client.

The method 500 may further include, responsive to a user command at the client or a termination of a period of time since initiation of the monitoring session, generating a monitoring termination command to terminate the monitoring session; and providing the monitoring termination command to the network.

Generating the monitoring initiation command and generating the monitoring termination command comprise adding a command to a page request that points a browser to the cloud-based application in response to one of: receiving user input into a search field of the browser; receiving user selection of a user interface element that causes the command to be added to the page request; automatically adding a command to the page request based on occurrence of an event or episode or termination of the event or episode.

In one form, the monitoring initiation command causes performance metrics to be captured, together with a monitoring session identifier, for pages of content provided by the cloud-based application to the client for the one or more services provided by the cloud-based application to the client until the monitoring termination command is provided. The performance metrics may include navigation timing application programming interface (API) metrics.

The method 500 may further include receiving input for the user that specifies a destination for delivery of the performance metrics obtained during the monitoring session. An example of this is the prompt 240 shown in FIG. 2.

The user-initiated monitoring techniques presented herein may be used in an enterprise where a service is set up internally for use by any user and tied in with the IT Help Desk organization of the enterprise. The techniques could even be activated for sampling internal Quality of Service (QoS) for users that use any cloud applications. In the consumer environment, these techniques may be used in a home as part of a publicly used service.

The advantages of these techniques are numerous. The end user monitoring solution presented herein may be fully "on-demand" so that there is no unnecessary, constant streaming of metrics consuming bandwidth. The parameters of the monitoring session are controlled by the user. The user initiates it and controls how it is used via query parameters in the address bar or headers from an extension. The performance metrics that result from the monitoring session may be shared with the user, the IT Help Desk, and/or even the cloud-based application service that the user access (via text and/or email). The solution may be completely automated into the IT help desk system, whereby help desk tickets are autogenerated with the request and metric responses automatically added to the tickets, then routed to an assigned IT professional to review. The monitoring session instrumentation is not tied to internal enterprise applications, but is tied to the client side by simply monitoring traffic into the cloud.

Figure 6:
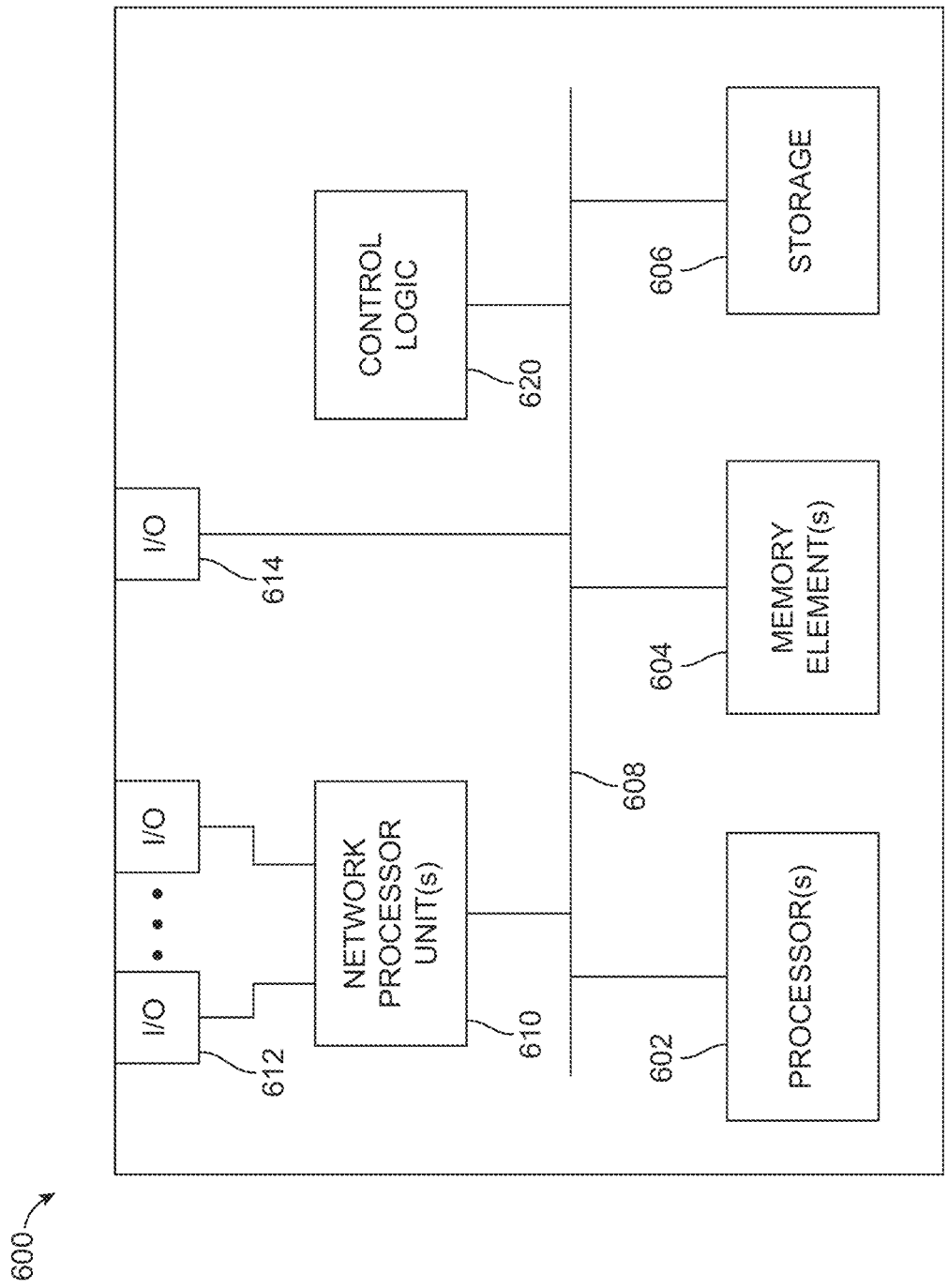
FIG. 6 is a hardware block diagram of a device that may be configured to perform the operations involved in end user monitoring techniques presented herein, according to an example embodiment.

Referring to FIG. 6, FIG. 6 illustrates a hardware block diagram of a computing/computer device 600 that may perform functions of a device associated with operations discussed herein in connection with the techniques depicted in FIGS. 1-5. In various embodiments, a computing device, such as computing device 600 or any combination of computing devices 600, may be configured as any devices as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, mouse, display, a touch screen display, and/or any other suitable input and/or output device now known or hereafter developed. These user input devices may be used by a user to initiate a monitoring session and to specify where the results of the monitoring session are to be delivered, as described above. This may be the case, in particular, when the computing device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a computer-implemented method performed by a client that is accessing one or more services from a cloud-based application, the method including: responsive to a user command from a user at the client or a particular event associated with one or more services provided by the cloud-based application to the client, generating a monitoring initiation command to initiate a monitoring session for network communications between the client and the cloud-based application; and providing the monitoring initiation command into a network, the monitoring initiation command causing at least one networking device in the network to gather performance metrics for the network communications associated with the one or more services provided by the cloud-based application for the client.

In some aspects, the techniques described herein relate to a method, wherein the monitoring initiation command is formatted according to a protocol that is understood by networking devices that carry the network communications between the client and the cloud-based application.

In some aspects, the techniques described herein relate to a method, further including: responsive to a user command at the client or a termination of a period of time since initiation of the monitoring session, generating a monitoring termination command to terminate the monitoring session; and providing the monitoring termination command to the network.

In some aspects, the techniques described herein relate to a method, wherein generating the monitoring initiation command and generating the monitoring termination command include adding a command to a page request that points a browser to the cloud-based application in response to one of: receiving user input into a search field of the browser; receiving user selection of a user interface element that causes the command to be added to the page request; automatically adding a command to the page request based on occurrence of an event or episode or termination of the event or episode.

In some aspects, the techniques described herein relate to a method, wherein the monitoring initiation command causes performance metrics to be captured, together with a monitoring session identifier, for pages of content provided by the cloud-based application to the client for the one or more services provided by the cloud-based application to the client until the monitoring termination command is provided.

In some aspects, the techniques described herein relate to a method, wherein the performance metrics include navigation timing application programming interface (API) metrics.

In some aspects, the techniques described herein relate to a method, wherein the monitoring initiation command includes a modified page request derived from a page request that points a web browser to the cloud-based application, and wherein the modified page request is configured to be intercepted and evaluated at one of: a networking device or access security broker in an enterprise network of the client; an access security broker in the network that hosts the cloud-based application; or the cloud-based application itself.

In some aspects, the techniques described herein relate to a method, further including receiving input for the user that specifies a destination for delivery of the performance metrics obtained during the monitoring session.

In some aspects, the techniques described herein relate to a method, wherein generating the monitoring initiation command further includes generating an identifier that is associated with the performance metrics obtained during the monitoring session.

In some aspects, the techniques described herein relate to an apparatus including: a network interface that enables communication over a network; a memory that stores data; and a processor coupled to the network interface and the memory, wherein the processor is configured to perform operations including: responsive to a user command from a user at the apparatus or a particular event associated with one or more services provided by a cloud-based application to the apparatus, generating a monitoring initiation command to initiate a monitoring session for network communications between the apparatus and the cloud-based application; and providing the monitoring initiation command into a network, the monitoring initiation command causing at least one networking device in the network to gather performance metrics for the network communications associated with the one or more services provided by the cloud-based application for the apparatus.

In some aspects, the techniques described herein relate to an apparatus, wherein the monitoring initiation command is formatted according to a protocol that is understood by networking devices that carry the network communications between the apparatus and the cloud-based application.

In some aspects, the techniques described herein relate to an apparatus, wherein the processor is further configured to perform operations including: responsive to a user command at the apparatus or a termination of a period of time since initiation of the monitoring session, generating a monitoring termination command to terminate the monitoring session; and providing the monitoring termination command to the network.

In some aspects, the techniques described herein relate to an apparatus, wherein generating the monitoring initiation command and generating the monitoring termination command include adding a command to a page request that points a browser to the cloud-based application in response to one of: receiving user input into a search field of the browser; receiving user selection of a user interface element that causes the command to be added to the page request; automatically adding a command to the page request based on occurrence of an event or episode or termination of the event or episode.

In some aspects, the techniques described herein relate to an apparatus, wherein the monitoring initiation command causes performance metrics to be captured, together with a monitoring session identifier, for pages of content provided by the cloud-based application to the apparatus for the one or more services provided by the cloud-based application to the apparatus until the monitoring termination command is provided.

In some aspects, the techniques described herein relate to an apparatus, wherein the monitoring initiation command includes a modified page request derived from a page request that points a web browser to the cloud-based application, and wherein the modified page request is configured to be intercepted and evaluated at one of: a networking device or access security broker in an enterprise network of the apparatus; an access security broker in the network that hosts the cloud-based application; or the cloud-based application itself.

In some aspects, the techniques described herein relate to one or more non-transitory computer readable media encoded with instructions that, when executed by a processor, cause the processor to perform a method on behalf of a client that is accessing one or more services from a cloud-based application, the method including: responsive to a user command from a user at the client or a particular event associated with one or more services provided by the cloud-based application to the client, generating a monitoring initiation command to initiate a monitoring session for network communications between the client and the cloud-based application; and providing the monitoring initiation command into a network, the monitoring initiation command causing at least one networking device in the network to gather performance metrics for the network communications associated with the one or more services provided by the cloud-based application for the client.

In some aspects, the techniques described herein relate to one or more non-transitory computer readable media, wherein the monitoring initiation command is formatted according to a protocol that is understood by networking devices that carry the network communications between the client and the cloud-based application.

In some aspects, the techniques described herein relate to one or more non-transitory computer readable media, wherein the method further includes: responsive to a user command at the client or a termination of a period of time since initiation of the monitoring session, generating a monitoring termination command to terminate the monitoring session; and providing the monitoring termination command to the network.

In some aspects, the techniques described herein relate to one or more non-transitory computer readable media, wherein generating the monitoring initiation command and generating the monitoring termination command include adding a command to a page request that points a browser to the cloud-based application in response to one of: receiving user input into a search field of the browser; receiving user selection of a user interface element that causes the command to be added to the page request; automatically adding a command to the page request based on occurrence of an event or episode or termination of the event or episode.

In some aspects, the techniques described herein relate to one or more non-transitory computer readable media, wherein the monitoring initiation command includes a modified page request derived from a page request that points a web browser to the cloud-based application, and wherein the modified page request is configured to be intercepted and evaluated at one of: a networking device or access security broker in an enterprise network of the client; an access security broker in the network that hosts the cloud-based application; or the cloud-based application itself.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may directly or indirectly connected utilizing any algorithms, communication protocols, interfaces, etc., (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method performed by a client that is accessing one or more services from a cloud-based application, the method comprising:

responsive to a user command from a user at the client or a particular event associated with one or more services provided by the cloud-based application to the client, generating a monitoring initiation command to initiate a monitoring session for network communications between the client and the cloud-based application, wherein generating the monitoring initiation command comprises adding a command to a page request that points a browser to the cloud-based application in response to one of: receiving user input into a search field of the browser, receiving user selection of a user interface element that causes the command to be added to the page request, or automatically adding the command to the page request based on occurrence of an event or episode or termination of the event or episode; and providing the monitoring initiation command into a network, the monitoring initiation command causing at least one networking device in the network to instantiate gathering of performance metrics for the network communications associated with the one or more services provided by the cloud-based application for the client.

2. The method of claim 1, wherein the monitoring initiation command is formatted according to a protocol that is understood by networking devices that carry the network communications between the client and the cloud-based application.

3. The method of claim 2, further comprising:
responsive to a user command at the client or a termination of a period of time since initiation of the monitoring session, generating a monitoring termination command to terminate the monitoring session; and
providing the monitoring termination command to the network.

4. The method of claim 3, wherein generating the monitoring termination command comprises adding another command to another page request that points the browser to the cloud-based application in response to one of: receiving another user input into the search field of the browser; receiving user selection of another user interface element that causes the another command to be added to the page request; or automatically adding the another command to the page request based on occurrence of another event or episode or termination of the another event or episode.

5. The method of claim 3, wherein the monitoring initiation command causes performance metrics to be captured, together with a monitoring session identifier, for pages of content provided by the cloud-based application to the client for the one or more services provided by the cloud-based application to the client until the monitoring termination command is provided.

6. The method of claim 1, wherein the performance metrics include navigation timing application programming interface (API) metrics.

7. The method of claim 1, wherein the monitoring initiation command comprises a modified page request derived from a page request that points a web browser to the cloud-based application, and wherein the modified page request is configured to be intercepted and evaluated at one of: a networking device or access security broker in an enterprise network of the client; an access security broker in the network that hosts the cloud-based application; or the cloud-based application itself.

8. The method of claim 1, further comprising receiving input for the user that specifies a destination for delivery of the performance metrics obtained during the monitoring session.

9. The method of claim 1, wherein generating the monitoring initiation command further includes generating an identifier that is associated with the performance metrics obtained during the monitoring session.

10. The computer-implemented method of claim 1, further comprising:
terminating the gathering of the performance metrics in response to a command from the user at the client.

11. An apparatus comprising:
a network interface that enables communication over a network;
a memory that stores data; and
a processor coupled to the network interface and the memory, wherein the processor is configured to perform operations including:
responsive to a user command from a user at the apparatus or a particular event associated with one or more services provided by a cloud-based application to the apparatus, generating a monitoring initiation command to initiate a monitoring session for network communications between the apparatus and the cloud-based application, wherein generating the monitoring initiation command comprises adding a command to a page request that points a browser to the cloud-based application in response to one of: receiving user input into a search field of the browser, receiving user selection of a user interface element that causes the command to be added to the page request, or automatically adding the command to the page request based on occurrence of an event or episode or termination of the event or episode; and
providing the monitoring initiation command into a network, the monitoring initiation command causing at least one networking device in the network to instantiate gathering of performance metrics for the network communications associated with the one or more services provided by the cloud-based application for the apparatus.

12. The apparatus of claim 11, wherein the monitoring initiation command is formatted according to a protocol that is understood by networking devices that carry the network communications between the apparatus and the cloud-based application.

13. The apparatus of claim 12, wherein the processor is further configured to perform operations including:
responsive to a user command at the apparatus or a termination of a period of time since initiation of the monitoring session, generating a monitoring termination command to terminate the monitoring session; and
providing the monitoring termination command to the network.

14. The apparatus of claim 13, wherein generating the monitoring termination command comprises adding another command to another page request that points the browser to the cloud-based application in response to one of: receiving another user input into the search field of the browser; receiving user selection of another user interface element that causes the another command to be added to the page request; or automatically adding the another command to the page request based on occurrence of another event or episode or termination of the another event or episode.

15. The apparatus of claim 13, wherein the monitoring initiation command causes performance metrics to be captured, together with a monitoring session identifier, for pages of content provided by the cloud-based application to the apparatus for the one or more services provided by the cloud-based application to the apparatus until the monitoring termination command is provided.

16. The apparatus of claim 11, wherein the monitoring initiation command comprises a modified page request derived from a page request that points a web browser to the cloud-based application, and wherein the modified page request is configured to be intercepted and evaluated at one of: a networking device or access security broker in an enterprise network of the apparatus; an access security broker in the network that hosts the cloud-based application; or the cloud-based application itself.

17. One or more non-transitory computer readable media encoded with instructions that, when executed by a processor, cause the processor to perform a method on behalf of a client that is accessing one or more services from a cloud-based application, the method comprising:

responsive to a user command from a user at the client or a particular event associated with one or more services provided by the cloud-based application to the client, generating a monitoring initiation command to initiate a monitoring session for network communications between the client and the cloud-based application, wherein generating the monitoring initiation command comprises adding a command to a page request that points a browser to the cloud-based application in response to one of: receiving user input into a search field of the browser, receiving user selection of a user interface element that causes the command to be added to the page request, or automatically adding the command to the page request based on occurrence of an event or episode or termination of the event or episode; and providing the monitoring initiation command into a network, the monitoring initiation command causing at least one networking device in the network to instantiate gathering of performance metrics for the network communications associated with the one or more services provided by the cloud-based application for the client.

18. The one or more non-transitory computer readable media of claim 17, wherein the monitoring initiation command is formatted according to a protocol that is understood by networking devices that carry the network communications between the client and the cloud-based application.

19. The one or more non-transitory computer readable media of claim 18, wherein the method further includes:

responsive to a user command at the client or a termination of a period of time since initiation of the monitoring session, generating a monitoring termination command to terminate the monitoring session; and providing the monitoring termination command to the network.

20. The one or more non-transitory computer readable media of claim 19, wherein generating the monitoring termination command comprises adding another command to another page request that points the browser to the cloud-based application in response to one of: receiving another user input into the search field of the browser; receiving user selection of another user interface element that causes the another command to be added to the page request; or automatically adding the another command to the page request based on occurrence of another event or episode or termination of the another event or episode.

21. The one or more non-transitory computer readable media of claim 17, wherein the monitoring initiation command comprises a modified page request derived from a page request that points a web browser to the cloud-based application, and wherein the modified page request is configured to be intercepted and evaluated at one of: a networking device or access security broker in an enterprise network of the client; an access security broker in the network that hosts the cloud-based application; or the cloud-based application itself.

* * * * *